(12) United States Patent
Matsui et al.

(10) Patent No.: US 6,523,246 B1
(45) Date of Patent: Feb. 25, 2003

(54) JIG USED FOR FORMATION OF FIBER-REINFORCED COMPOSITE STRUCTURE AND METHOD FOR FORMATION OF FIBER-REINFORCED COMPOSITE STRUCTURE USING JIG

(75) Inventors: Nobuo Matsui, Saitama-ken (JP); Junichi Kondo, Saitama-ken (JP); Yuki Kasahara, Saitama-ken (JP); Makoto Nasu, Saitama (JP); Keiichi Sato, Saitama-ken (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 150 days.

(21) Appl. No.: 09/721,633

(22) Filed: Nov. 27, 2000

(30) Foreign Application Priority Data

Nov. 26, 1999 (JP) .............................. 11-336775

(51) Int. Cl.$^7$ .............................. B23Q 7/00; B23Q 3/00; B25B 27/14; B23P 11/02
(52) U.S. Cl. .......................... 29/559; 29/281.1; 29/450; 29/453; 29/464
(58) Field of Search .......................... 29/559, 450, 453, 29/235, 281.1, 283, 464, 456, 525; 403/205; 52/665

(56) References Cited

U.S. PATENT DOCUMENTS

| | | | | |
|---|---|---|---|---|
| 2,766,855 A | * | 10/1956 | Johnson et al. ............. | 52/126.3 |
| 3,787,130 A | * | 1/1974 | Hemmings et al. ......... | 403/205 |
| 4,606,961 A | * | 8/1986 | Munsen et al. ............. | 428/105 |

* cited by examiner

Primary Examiner—Gregory M. Vidovich
Assistant Examiner—John C. Hong
(74) Attorney, Agent, or Firm—Sughrue Mion, PLLC

(57) ABSTRACT

A forming jig used for forming a fiber-reinforced composite structure from a plurality of first fiber-reinforced composite preforms $1a, 1b, \ldots$ linearly arranged at given intervals and one or more second fiber-reinforced composite preforms $2a, \ldots$ passing through gaps between adjacent two first preforms and intersecting a row of the first preforms $1a, 1b, \ldots$ comprises a combination of (a) elastic jigs 5 engageable with the intersections of the row of the first preforms $1a, 1b, \ldots$ and the second preforms $2a, \ldots$, and (b) rigid jigs 6, 6' attachable to the first preforms $1a, 1b, \ldots$ and the second preforms $2a$, in portions of these preforms other than the intersections.

12 Claims, 7 Drawing Sheets

JIG USED FOR FORMATION OF FIBER-REINFORCED COMPOSITE STRUCTURE AND METHOD FOR FORMATION OF FIBER-REINFORCED COMPOSITE STRUCTURE USING JIG

FIELD OF THE INVENTION

The present invention relates to a jig used for forming a fiber-reinforced composite structure, as well as to a method for forming a fiber-reinforced composite structure using the jig. More particularly, the present invention relates to a jig comprising a combination of elastic jigs and rigid jigs and repeatedly usable for the formation of a fiber-reinforced composite structure in excellent dimensional and positional accuracy, as well as to a method for forming a fiber-reinforced composite structure using the jig.

BACKGROUND OF THE INVENTION

Because fiber-reinforced composites are light in weight and have high strength, they are widely used for various structural members of automobiles, vessels, aircraft, etc. Fiber-reinforced composite structures are usually formed by impregnating a woven fabric of reinforcing fibers with a thermosetting or thermoplastic resin to form a plurality of prepregs, laminating the prepregs on a forming plate of a predetermined shape to form a preform, and subjecting the preform to pressurization and heating using a pressurizing bag. The preform, however, is likely to be deformed owing to fluidization of the resin in the preform during the above process if the preform has a complex shape, resulting in low dimensional and positional accuracy in the formed fiber-reinforced composite structure, particularly on the pressurizing bag side.

Hence, it is being attempted to make uniform the pressure applied by the pressurizing bag and improve the dimensional accuracy of the formed composite structure by placing an auxiliary forming member made of an elastomer (e.g. a silicone rubber), on the pressurizing bag side of the preform. However, because the elastomer is soft, it is necessary to use, in combination with the auxiliary forming member, a large positioning jig made of a metal in order to obtain high positional accuracy. Further, because the auxiliary forming member made of an elastomer tends to shrink owing to its chemical reaction with the epoxy resin, etc. in the preform and also the pressurization and heating applied during the forming process, the once-used auxiliary forming member has a shape not compatible with the positioning jig, making impossible its repeated use.

OBJECT OF THE INVENTION

Therefore, an object of the present invention is to provide a forming jig repeatedly usable for the formation of a fiber-reinforced composite structure in excellent dimensional and positional accuracy without using any large positioning jigs.

Another object of the present invention is to provide a method for forming a fiber-reinforced composite structure using such a forming jig.

DISCLOSURE OF THE INVENTION

As a result of intensive research in view of the above objects, the present inventors have found that by using a forming jig comprising a combination of elastic jigs and rigid jigs, there can be formed a fiber-reinforced composite structure constituted by a plurality of first fiber-reinforced composite preforms linearly arranged at given intervals, and one or more second fiber-reinforced composite preforms passing through gaps between two adjacent first fiber-reinforced composite preforms and intersecting a row of the first preforms, in excellent positional and dimensional accuracy. The present invention has been completed based on the finding.

Thus, the forming jig of the present invention used for forming a fiber-reinforced composite structure from a plurality of first fiber-reinforced composite preforms linearly arranged at given intervals, and one or more second fiber-reinforced composite preforms passing through the gaps between adjacent two first preforms and intersecting a row of the first preforms, comprises a combination of (a) elastic jigs engageable with intersections between a row of the first preforms and the second preforms, and (b) rigid jigs attachable to the first preforms and the second preforms in portions of these preforms other than the intersections. The constitution of this forming jig provides high forming accuracy without using any large positioning jigs.

The width of each elastic jig in the direction of arrangement of the first preforms is preferably slightly larger in a free state than when combined with the rigid jigs for the formation of a fiber-reinforced composite structure. Thus, the rigid jigs are in pressure contact with the elastic jigs owing to their elasticity, securing the relative positions of the first preforms and the second preforms. Further, even if the elastic jigs shrink in the forming process, repeated forming is possible at a high forming accuracy.

Also, the forming jig of the present invention is preferably used together with an auxiliary forming panel made of a fiber-reinforced composite and two or more fixing means for fixing the preforms on the auxiliary forming panel. Combined use of the elastic jigs and the rigid jigs can keep the relative positions of the first preforms and the second preforms at a high accuracy. Therefore, mere fixing of ends of the preforms onto the auxiliary forming panel with simple fixing means can secure the positional accuracy of all the preforms.

The elastic jigs are preferably made of a silicone rubber, and the rigid jigs are preferably made of aluminum. Also, buffer members are preferably attached to the rigid jigs.

In one preferred embodiment, the first preform constitutes frames of an airplane body, while the second preform constitutes stringers of an airplane body.

The method of the present invention for forming the above fiber-reinforced composite structure uses a forming jig comprising a combination of (a) elastic jigs engageable with the intersections of a row of the first preforms and the second preforms, and (b) rigid jigs attachable to the first preforms and the second preforms in portions of these preforms other than the intersections.

DESCRIPTION OF PREFERRED EMBODIMENTS OF THE INVENTION

Described below referring to FIGS. 1 to 8 are forming jigs and methods for forming fiber-reinforced composite structures using the forming jigs according to the preferred embodiments of the present invention.

Figure 1:
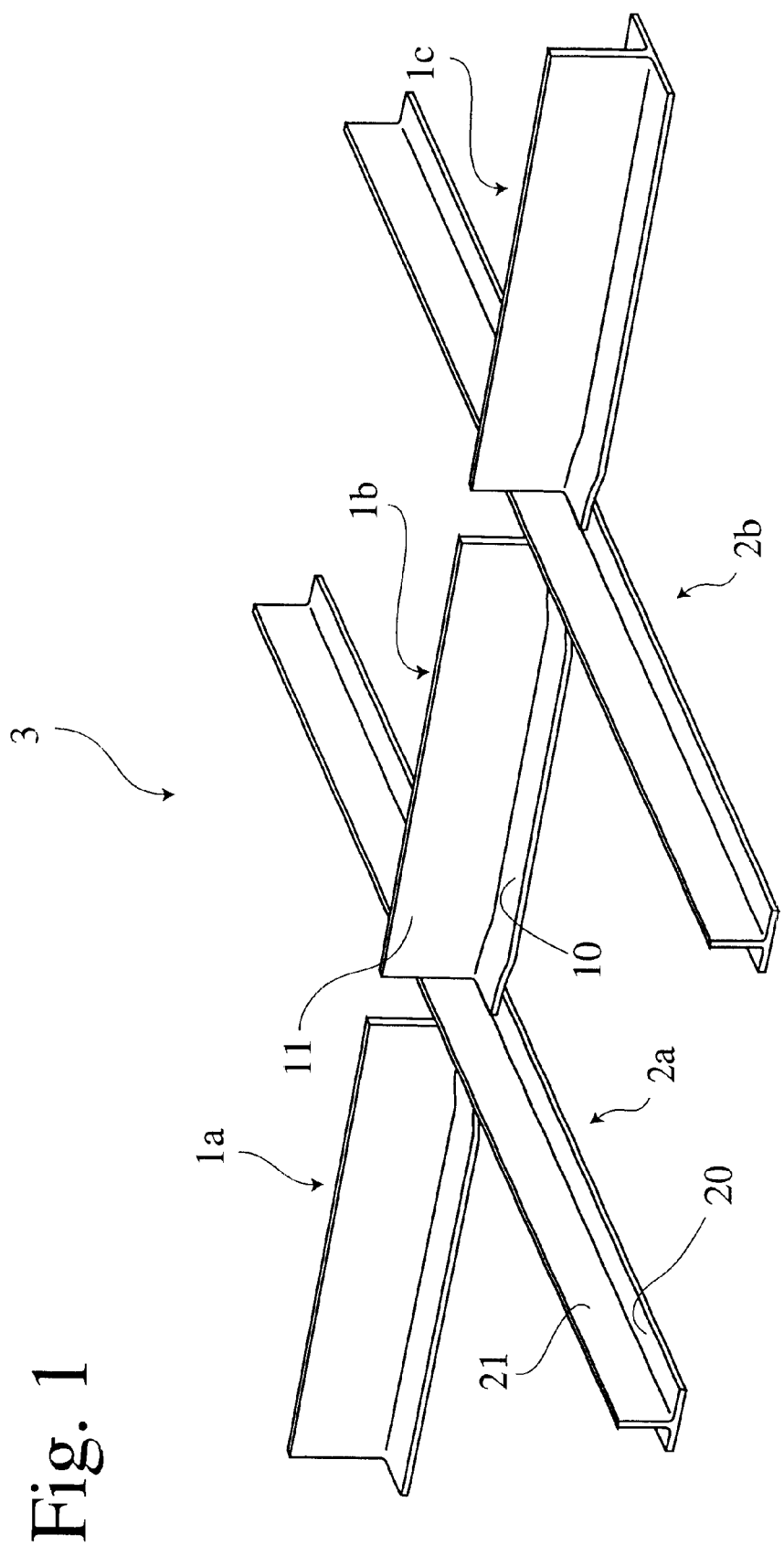
FIG. 1 is a perspective view showing an example of the fiber-reinforced composite structure formed using the forming jig of the present invention.

In FIG. 1 is shown an example of the fiber-reinforced composite structure formed using the forming jig of the present invention. In FIG. 1, a fiber-reinforced composite structure 3 is constituted by a plurality of first preforms 1a, 1b, 1c and one or more second preforms 2a, 2b. Each of the first preforms 1a, 1b, 1c comprises a base portion 10 and a projecting portion 11 extending perpendicularly from the base portion 10 substantially at a lengthwise center thereof, and each of the second preforms 2a, 2b comprises a base portion 20 and a projecting portion 21 extending perpendicularly from the base portion 20 substantially at a lengthwise center thereof. A plurality of the first preforms 1a, 1b, 1c are arranged linearly at given intervals; and the second preforms 2a, 2b are arranged so as to pass through gaps between the first preforms 1a, 1b, 1c and intersect a row of the first preforms.

In this example, each base portion 10 of the first preforms 1a, 1b, 1c has a step partially, and each base portion 20 of the second preforms 2a, 2b has a flat surface. The shapes of these preforms are not restricted thereto, and the whole base portion may have a curved surface or a plurality of steps. The numbers and positions of the first and second preforms are not critical, either, and the fiber-reinforced composite structure may have a lattice shape, etc.

Each preform is made of a fiber-reinforced composite. The fiber-reinforced composite is preferably formed by impregnating a woven fabric of reinforcing fibers (e.g. carbon fibers, glass fibers or aramid fibers) with a thermosetting resin or a thermoplastic resin to form a plurality of prepregs, laminating these prepregs, and subjecting the resin in the laminated prepregs to partial reaction or fusion. As the thermosetting resin, an epoxy resin or the like is preferred; as the thermoplastic resin, nylon or the like is preferred. The first preforms 1a, 1b, 1c, . . . and the second preforms 2a, 2b, . . . may be made of different materials, though they are preferably made of the same material in view of adhesivity to each other.

Figure 2:
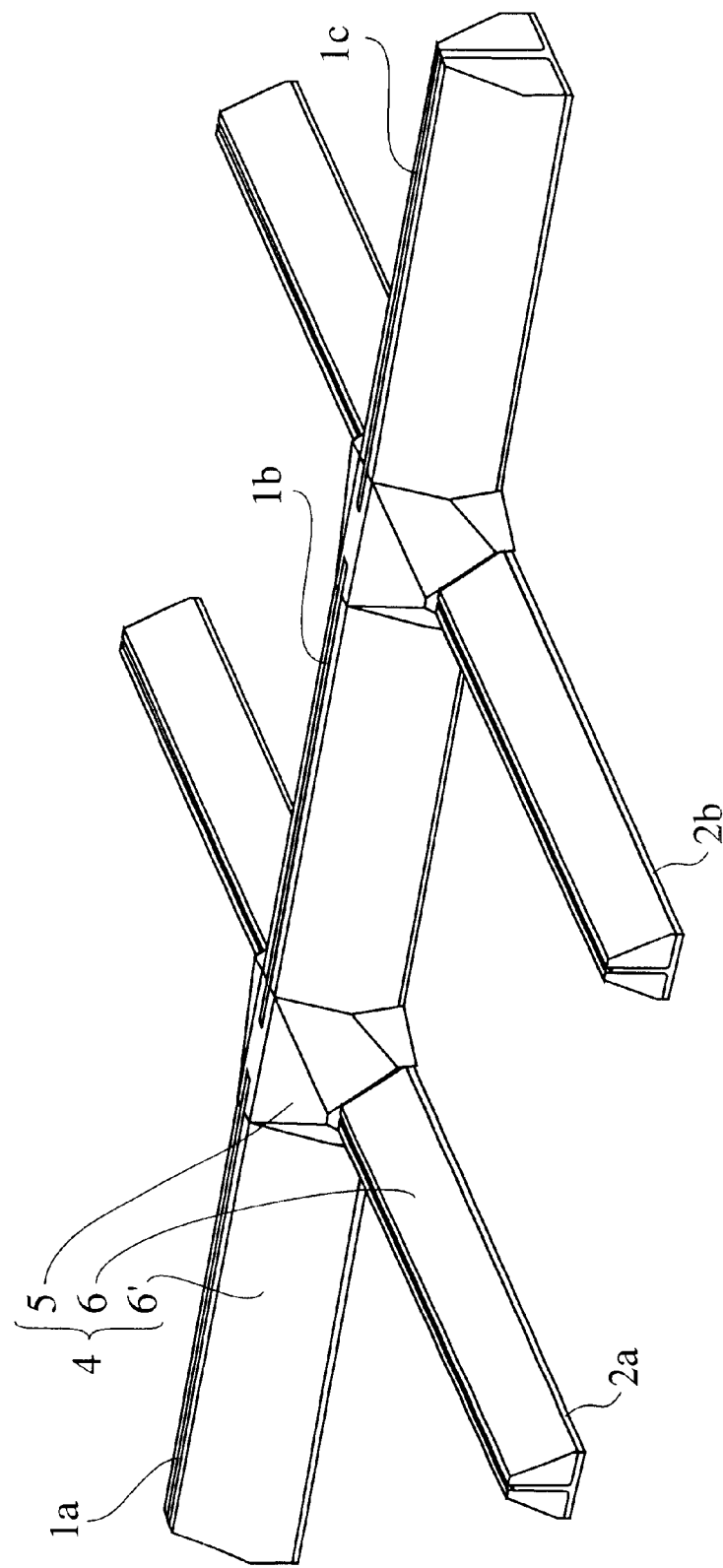
FIG. 2 is a perspective view showing a state wherein a forming jig of the present invention is mounted on the fiber-reinforced composite structure shown in FIG. 1.

The forming jig of the present invention comprises a combination of elastic jigs and, rigid jigs. FIG. 2 shows a state wherein the forming jig 4 of the present invention comprising a combination of a plurality of elastic jigs 5 and a plurality of rigid jigs 6, 6' is mounted onto the fiber-reinforced composite structure 3 shown in FIG. 1. The elastic jigs 5 are mounted to the intersections of the row of the first preforms 1a, 1b, 1c, . . . and the second preforms 2a, 2b, . . . , and the rigid jigs 6, 6' are mounted to the first and second preforms in their portions other than the intersections. Thus, in the present invention, the elastic jigs 5 and the rigid jigs 6, 6' are used so as to match the shapes of the first and second preforms while compensating the disadvantages of each jig. That is, the elastic jigs 5 are used at the intersections having a complex shape to achieve high dimensional accuracy, while the rigid jigs 6, 6' fix the elastic jigs 5 at predetermined positions to achieve high positional accuracy.

Figure 3:
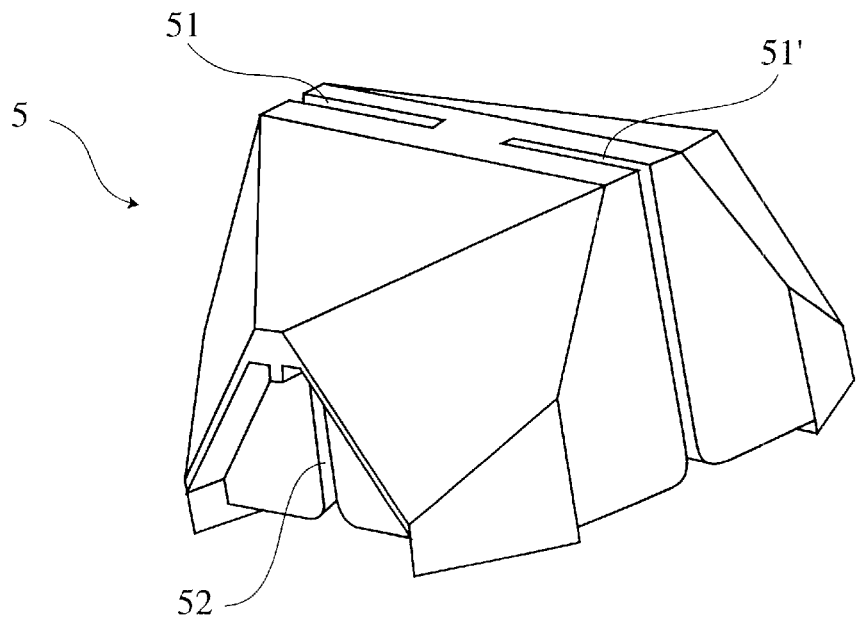
FIG. 3 is a perspective view showing an example of the elastic jig used in the present invention.
Figure 4:
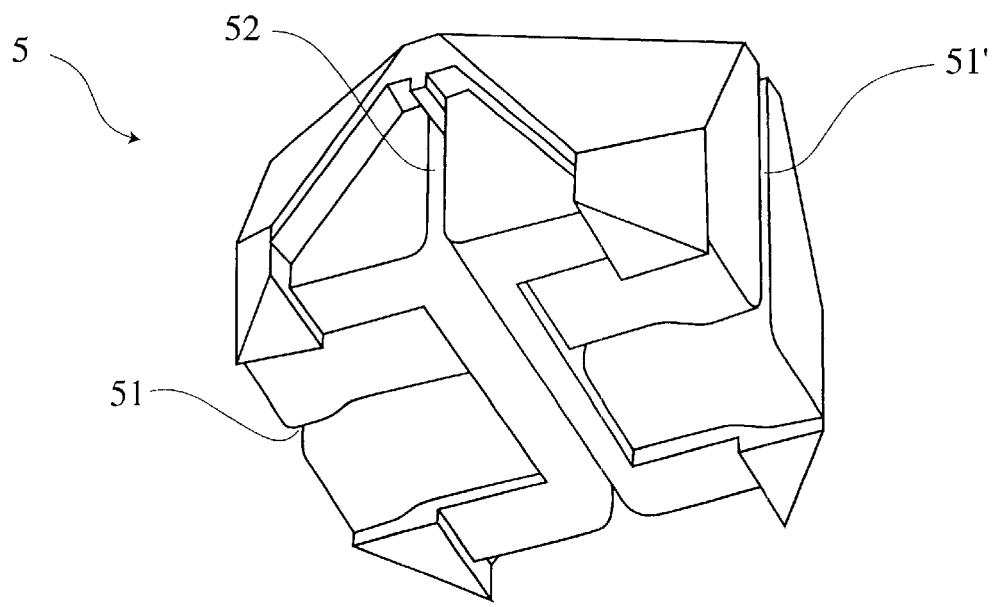
FIG. 4 is a perspective view of the elastic jig shown in FIG. 3 when seen from below.

The elastic jigs 5 can have any shapes as long as they can be used in combination with the rigid jigs 6, 6' and can be fitted to the intersections of the first preforms and the second preforms. The details of the elastic jig 5 shown in FIG. 2 are shown in FIGS. 3 and 4. FIG. 3 is a perspective view of the elastic jig 5 seen from above, and FIG. 4 is a perspective view seen from below. The elastic jig 5 has slits 51, 51' into which first preforms 1a, . . . are inserted, and a slit 52 into which a second preform 2a, . . . is inserted.

Figure 5A:
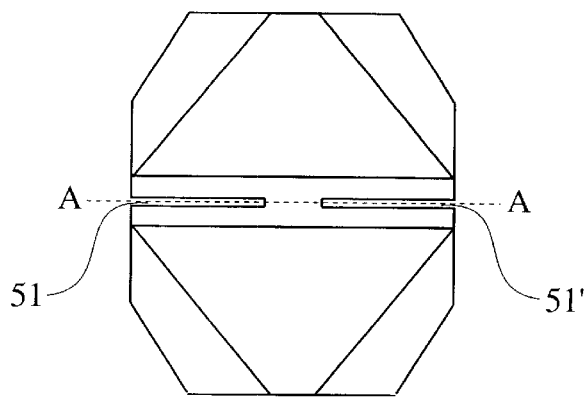
FIG. 5(a) is a top view of the elastic jig shown in FIG. 3.
Figure 5B:
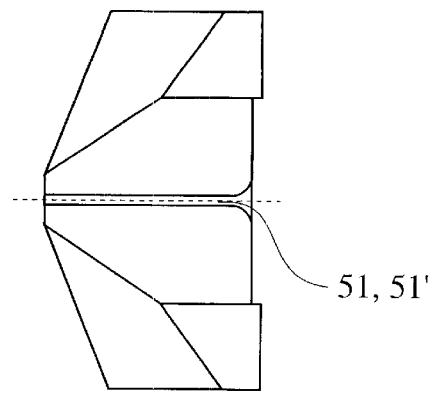
FIG. 5(b) is a side view of the elastic jig shown in FIG. 3.
Figure 5C:
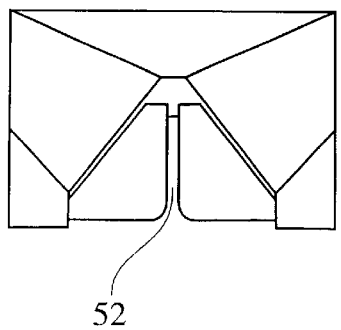
FIG. 5(c) is a front view of the elastic jig shown in FIG. 3.
Figure 5D:
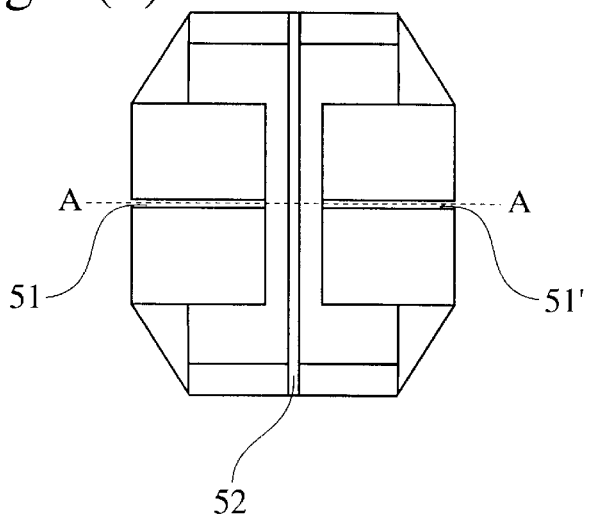
FIG. 5(d) is a bottom view of the elastic jig shown in FIG. 3.
Figure 6A:
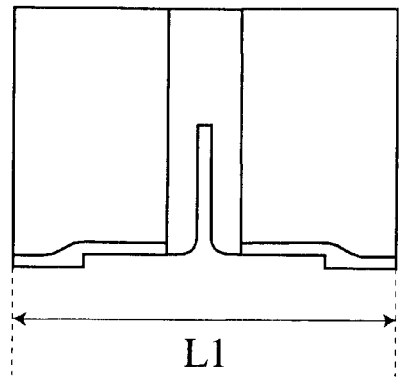
FIG. 6(a) is an A—A sectional view of the elastic jig shown in FIG. 5.
Figure 6B:
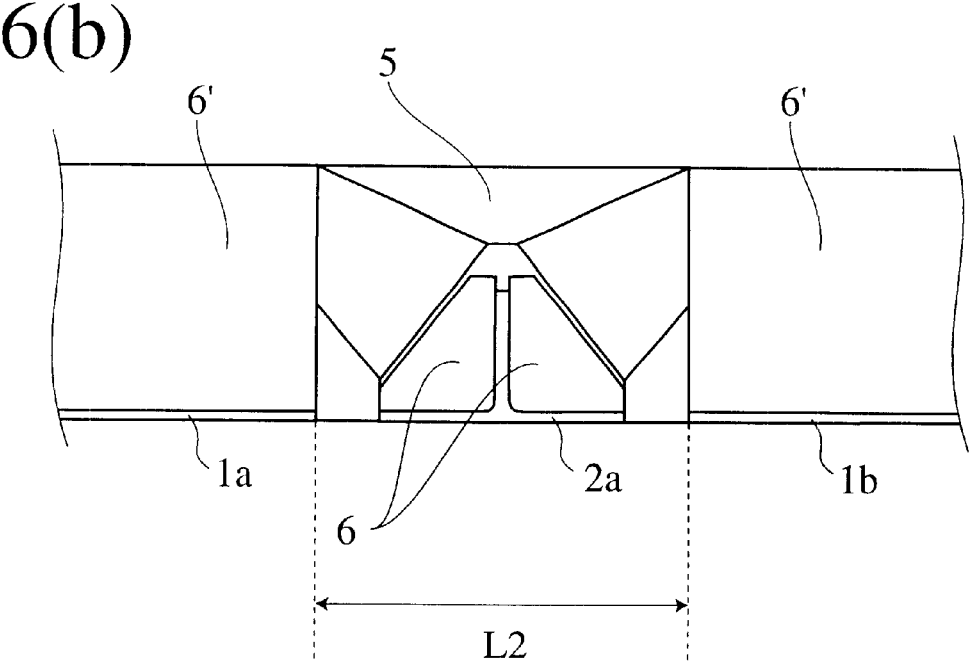
FIG. 6(b) is a fragmentary front view showing a state wherein a forming jig of the present invention is mounted on a fiber-reinforced composite structure.

FIG. 5(a) is a top view of the elastic jig 5; FIG. 5(b) is a side view of the elastic jig 5; FIG. 5(c) is a front view of the elastic jig 5; and FIG. 5(d) is a bottom view of the elastic jig 5. FIG. 6(a) is a sectional view of the elastic jig 5 taken along the line A—A in FIG. 5. In order to obtain excellent forming accuracy, the width of the elastic jig 5 in the direction of arrangement of the first preforms 1a, . . . is preferably slightly larger in a free state than when combined with the rigid jigs 6, 6' for the formation of a fiber-reinforced composite structure. For example, the width $L_1$ of the elastic jig 5 before a forming operation as shown in FIG. 6(a) is preferably larger than the width $L_2$ of the elastic jig 5 after a forming operation as shown in FIG. 6(b), and specifically, they preferably satisfy the relation of $2\% < [(L_1-L_2)/L_2] \times 100\% < 5\%$.

The elastic jig 5 used in the present invention is preferably made of an elastomer having elasticity, heat resistance and releasability, and a preferred example of such an elastomer is a silicone rubber.

Because the rigid jigs 6, 6' used in the present invention are not critical in shape, they can be in any shape as long as they can maintain the positional accuracy of the composite structure formed, in combination with the elastic jig 5. The rigid jigs 6, 6' are preferably made of a material having excellent dimensional stability, strength and rigidity and small thermal expansion. As such a material, there can be mentioned metallic materials such as steel, stainless steel, aluminum and the like; graphite; CFRP; and so forth. Of these materials, aluminum is particularly preferred.

Figure 7:
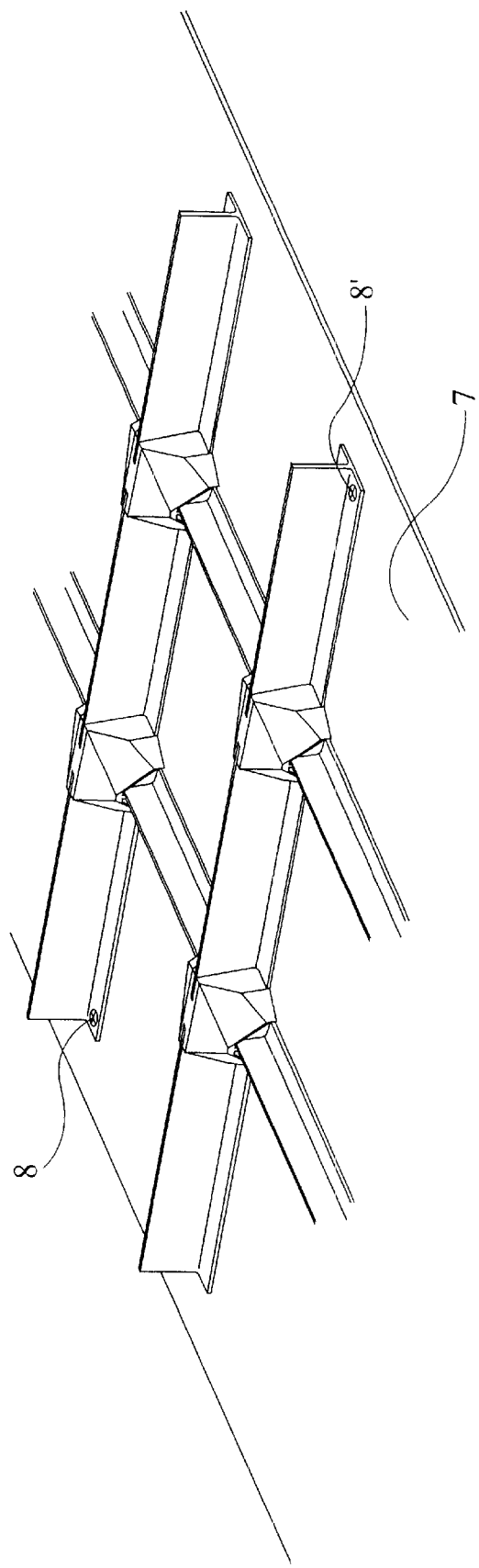
FIG. 7 is a fragmentary perspective view showing a state wherein a fiber-reinforced composite structure provided with a forming jig of the present invention is fixed to an auxiliary forming panel.

The forming jig of the present invention is preferably used together with an auxiliary forming panel and two or more fixing means for fixing the first and second preforms on the panel. For example, ends of the preforms may be fixed to an auxiliary forming panel 7 with fixing means 8, 8' as shown in FIG. 7 (rigid jigs are not shown). In the present invention, because the relative positional accuracy of the first preforms and the second preforms is secured by using a combination of the elastic jigs and the rigid jigs, mere fixing of the preforms at ends with fixing means can secure the positional accuracy of all the preforms.

The auxiliary forming panel is preferably made of a fiber-reinforced composite, more preferably the same fiber-reinforced composite material as used in the preforms. The auxiliary forming panel may have a flat surface, a curved surface or any other surface. The fixing means can be a mechanical fixing means such as screw, clamp or the like, or can be partial fusion by heating using a dryer, a low-temperature soldering iron, or the like.

Figure 8:
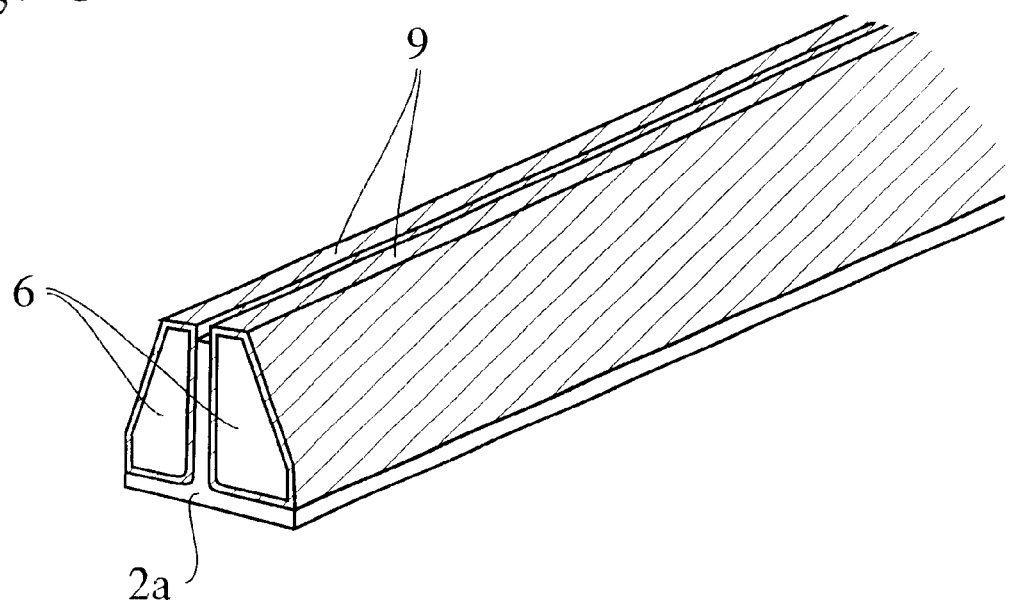
FIG. 8 is a fragmentary perspective view showing a state wherein a buffer member is attached to a surface of the rigid jig of the present invention.

When the auxiliary forming panel has an unevenness thickness because of varied lamination thereof, the rigid jigs made of a metal or the like fail to follow the surface unevenness of the panel, resulting in frequent generation of voids in the composite structure formed. In order to absorb the surface unevenness of the panel, it is preferred to attach a buffer member 9 to the rigid jigs 6, 6'. FIG. 8 shows a state wherein a buffer member 9 is attached to rigid jigs 6, 6'. By attaching a releasable buffer member 9, no releasing treatment is required, ensuring further cost reduction.

As the buffer member 9 usable in the present invention, a Teflon adhesive tape, a silicone rubber, etc. are mentioned. Of these, a Teflon adhesive tape is preferred because it allows repeated use because of easy re-adhesion. The buffer member is not critical in thickness, though a smaller thickness is preferred for easy winding. The thickness of the buffer member is preferably 0.1 to 0.3 mm.

The fiber-reinforced composite structure of the present invention is formed from the first preforms and the second preforms using the forming jig. For example, the first preforms and the second preforms provided with the forming jigs are pressurized and heated to fluidize the thermosetting or thermoplastic resin in the prepregs constituting each preform, whereby an integral fiber-reinforced composite structure is formed. The pressure used in the pressurization is preferably about 6 kg cm$^2$, and the heating temperature is preferably 120 to 250° C. usually although it may slightly differ depending upon the kind of the thermosetting or thermoplastic resin in each prepreg. If necessary, the above-mentioned auxiliary forming panel and two or more fixing means may be used. The above-mentioned buffer member 9 is preferably attached to the rigid jigs 6, 6'.

The method for forming a fiber-reinforced composite structure according to the present invention is suited for the formation of structural members of automobiles, vessels, aircraft, etc., particularly for the formation of frames and stringers of airplane bodies. In FIG. 1, the first preforms 1a, 1b, 1c constitute frames of an airplane body, while the second preforms 2a, 2b constitute stringers of an airplane body.

Though the forming jig of the present invention and the method for forming a fiber-reinforced composite structure using the jig have been explained above, the present invention is not restricted thereto, and any variations and modifications are possible unless the scope and spirit of the present invention are changed.

As described in detail above, a fiber-reinforced composite structure can be formed at high dimensional and positional accuracy by using the forming jig of the present invention. Further, the forming jig of the present invention can be used repeatedly. According to the present forming method, a fiber-reinforced composite structure can be formed at excellent accuracy without using any large positioning jig. The forming method of the present invention is suited for the formation of frames and stringers of airplane bodies.

What is claimed is:

1. A forming jig for forming a fiber-reinforced composite structure from a plurality of first preforms linearly arranged in a row and at least one second preform passing through a gap between two adjacent first preforms, thereby forming an intersection between the two adjacent first preforms and the second preform, the forming jig comprising:

an elastic jig, which is formed from an elastomer, engageable with the intersection between the two adjacent first preforms and the second preform, such that said elastic jig interposes between the two adjacent first preforms; and rigid jigs attachable to the first preforms and the second preform at locations other than the intersection.

2. The forming jig according to claim 1, wherein the width of said elastic jig in the direction of arrangement of the first preforms is larger in a free state than when combined with said rigid jigs.

3. The forming jig according to claim 1, further comprising:

an auxiliary forming panel made of a fiber-reinforced composite; and at least one fixing means for fixing the first and the second preforms onto said auxiliary forming panel.

4. The forming jig according to claim 1, wherein said elastic jig is made of a silicone rubber, and said rigid jigs are made of aluminum.

5. The forming jig according to claim 1, wherein a buffer member is attached to said rigid jigs.

6. The forming jig according to claim 1, wherein the first preforms constitute frames of an airplane body, and the second preform constitutes a stringer of the airplane body.

7. A method for forming a fiber-reinforced composite structure comprising:

arranging a plurality of first fiber-reinforced composite preforms in a linear fashion;

positioning a second fiber-reinforced composite preform in a gap between two adjacent first preforms, thereby forming an intersection between the two adjacent first preforms and the second preform;

positioning an elastic jig, which is formed from an elastomer, at the intersection between the two adjacent first preforms and the second preform, such that the elastic jig is interposed between the two adjacent first preforms; and attaching rigid jigs to the first preforms and the second preform at locations other than the intersection.

8. The method according to claim 7, further comprising:

reducing the width of the elastic jig in the direction of arrangement of the first preforms upon attaching the rigid jigs to the first preforms and the second preform.

9. The method according to claim 7, further comprising:

fixing the first and the second preforms onto an auxiliary forming panel, which is made of a fiber-reinforced composite.

10. The method according to claim 7, wherein the elastic jig is made of a silicone rubber, and the rigid jigs are made of aluminum.

11. The method according to claim 7, further comprising:

attaching a buffer member to the rigid jigs.

12. The method for forming a fiber-reinforced composite structure according to claim 7, wherein the first preforms constitute frames of an airplane body, and the second preform constitutes a stringer of an airplane body.

* * * * *